J. L. SMITH.
STORAGE BATTERY.
APPLICATION FILED AUG. 10, 1911.
1,021,900.
Patented Apr. 2, 1912.
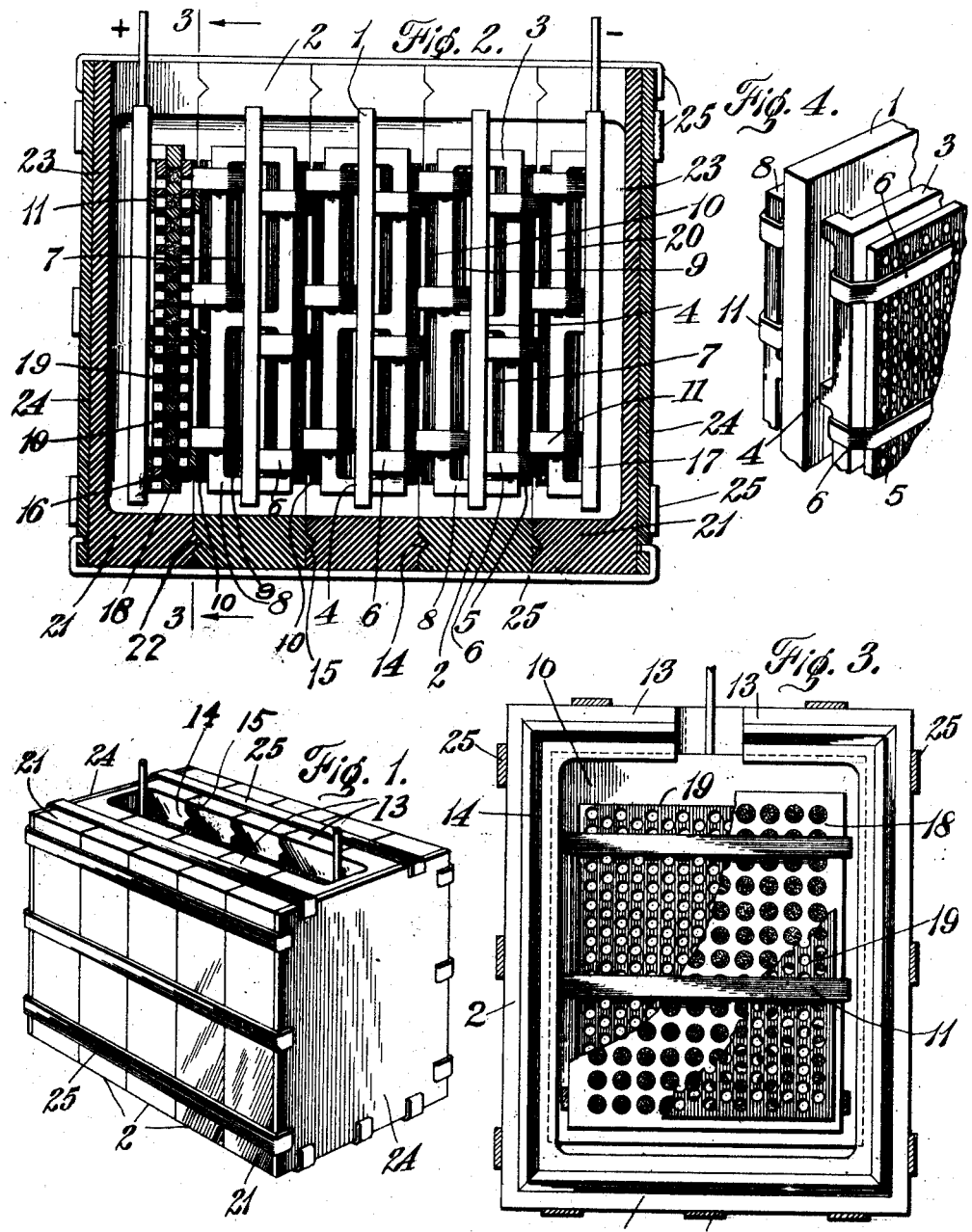
Witnesses
Chas. W. Stauffiger
Anna C. Ranler
Inventor
John L. Smith.
By
Attorneys

UNITED STATES PATENT OFFICE.

JOHN L. SMITH, OF DETROIT, MICHIGAN.

STORAGE BATTERY.

1,021,900.  Specification of Letters Patent.  Patented Apr. 2, 1912.

Application filed August 10, 1911. Serial No. 643,281.

*To all whom it may concern:*

Be it known that I, JOHN L. SMITH, a citizen of the United States of America, residing at Detroit, in the county of Wayne and State of Michigan, have invented certain new and useful Improvements in Storage Batteries, of which the following is a specification, reference being had therein to the accompanying drawings.

This invention relates to storage batteries and to an arrangement of the elements of the plates thereof whereby a very large area of wetted plate surface is obtained in small space and whereby a cell may be built up of any preferred capacity of interchangeable elements that are readily assembled.

The invention consists in the matters hereinafter set forth, and more particularly pointed out in the appended claims.

In the drawings, Figure 1 is a view in perspective of an assembled cell that embodies features of the invention; Fig. 2 is a view in longitudinal section therethrough, parts being exaggerated in thickness in order to give a clear view; Fig. 3 is a view in section on line 3—3 of Fig. 2 with parts broken away; and Fig. 4 is a view in detail of one of the couples of the cell.

As herein shown a neutral supporting sheet 1 is supported in a spacing frame 2 of suitable material such as soft rubber, or other elastic, non-conducting material. A honeycombed or perforated positive plate 3 whose openings are filled with any preferred form of active agent, such as red lead or the like is secured in parallel spaced relation to one face of the supporting sheet 1, preferably by fusing the margins thereto at intervals as indicated at 4, or in any other suitable manner insuring good electrical connection between the parts, and rigid support to the plate, while at the same time leaving both sides of the plate or grid free to be wetted by battery fluid when immersed therein. A perforated shield 5 of hard rubber or the like is bound against the outer face of the plate 3 as by rubber bands 6, the latter also securing an inner separator 7 of similar material. These plates act as retainers to aid in holding the active material in the pockets of the grids. On the other side of the supporting sheet 1 is a negative plate 8 of proper material secured in spaced relation to the supporting sheet 1 in the same manner as the positive plate 3 and liners or shields 9 and 10 similar to those of the positive grid are held in position by clamping bands 11. Because of the spaced relation of the grids from the supporting sheet 1, both faces of the grids or plates are exposed to or wetted by the battery fluid.

The spacing frame 2 is preferably of soft rubber and embraces the lateral margins of the sheet 1, the upper inturned end portions 13 extending partially across the upper margin. An interval is left between the lower margin of the sheet 1, and the lower member of the frame 2. One of the side faces of the frame 2 is provided with a tongue or rib 14 adapted to mate with and enter a corresponding groove 15 in the face of a companion frame, or is otherwise designed to form a tight joint therewith. A pair of end sheets 16 and 17 are also provided. One of these has on its inner face a positive grid 18 and liners 19 similar to those of the intermediate plates; the other sheet 17 supports a plate 20 similar to the negative elements of the intermediate sheets. Each end sheet is closed in a spacing member 21 of material similar to that used in the spacing frame 2. One of the members has a rib 22 adapted to enter the groove of an intermediate adjacent frame 2 or other provision for making a tight joint therewith, and is closed by an outer wall 23 adapted to form the end wall of an assembled cell. The other end member is channeled to receive the ribs of the adjacent intermediate frame. Outer plates 24 of suitable material reinforce the walls 23. The intermediate sections and the end plates are secured in assembled relation by suitable means, as, for example, clamping strips 25 whose inturned ends enter suitable recesses or openings in the reinforcements 24. The supporting sheet 1 is of such material that it is not effected by the action of the battery fluid upon the nascent material in the grids.

One feature of this construction is the arrangement whereby both the inner and outer surface of both the positive and negative elements of each couple are wetted by the battery fluid while at the same time they are sustained in proper relation by the support so that they cannot be dislodged or displaced.

Another feature is the construction of the cell exterior by the use of the intermediate frame and end members whereby a cell may be built up of any desired capacity from units which are readily manufactured in quantities. Owing to this construction, a cell is readily taken down or apart for inspection, for replacement of any couple or for cleaning purposes.

Obviously, changes may be made without departing from the spirit of the invention and I do not wish to limit myself to any particular form or arrangement of parts.

What I claim is:

1. In a storage battery, a liquid holder formed of assembled frames of elastic non-conducting material, supporting sheets each secured in a frame in spaced relation to the adjacent sheet, positive and negative plates in pairs on the opposite faces of the supporting sheets and secured in spaced relation thereto along their margins, and retaining perforated linings of non-conducting material each secured against the face of a plate.

2. In a storage battery, end and intermediate spacing frames of elastic material adapted to form a liquid holder when assembled, a supporting sheet secured in each frame, positive and negative plates secured to the faces of the sheets in spaced relation thereto by inwardly extending marginal portions of the plates in intimate electrical contact with the sheets, and means for clamping the frames in assembled relation.

3. In a storage battery, end spacing frames of elastic, non-conducting material, intermediate spacing frames of similar material adapted when assembled therewith to interlock and form a liquid holder, supporting sheets each secured by its lateral margins in a frame at an interval from the bottom thereof, positive and negative plates each secured to the face of a sheet at an interval therefrom by inset portions of the plates forming electrical contacts with the sheets, and means for securing the frames in assembled relation.

4. In a storage battery, end spacing frames of elastic, non-conducting material, intermediate spacing frames of similar material adapted when assembled therewith to interlock and form a liquid holder, supporting sheets each secured by its lateral margins in a frame at an interval from the bottom thereof, positive and negative plates each secured to the face of a sheet at an interval therefrom, perforated linings of non-conducting material secured against the outer faces of the plates, and means for securing the frames in assembled relation.

In testimony whereof I affix my signature in presence of two witnesses.

JOHN L. SMITH.

Witnesses:
C. R. STICKNEY,
OTTO F. BARTHEL.